Nov. 1, 1955   H. F. KENNISON   2,722,438
FLEXIBLE PACKING FOR PIPE IN SOCKET JOINT
Filed March 31, 1949   2 Sheets-Sheet 1

INVENTOR.
Hugh F. Kennison
BY
Robert S. Dunham
ATTORNEY

Nov. 1, 1955 H. F. KENNISON 2,722,438
FLEXIBLE PACKING FOR PIPE IN SOCKET JOINT
Filed March 31, 1949 2 Sheets-Sheet 2
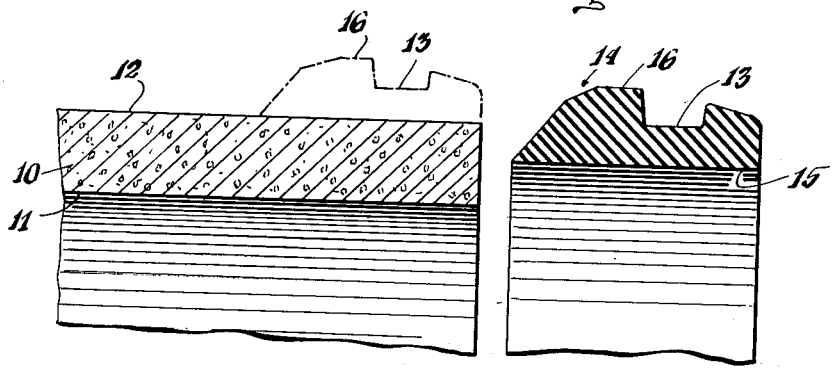
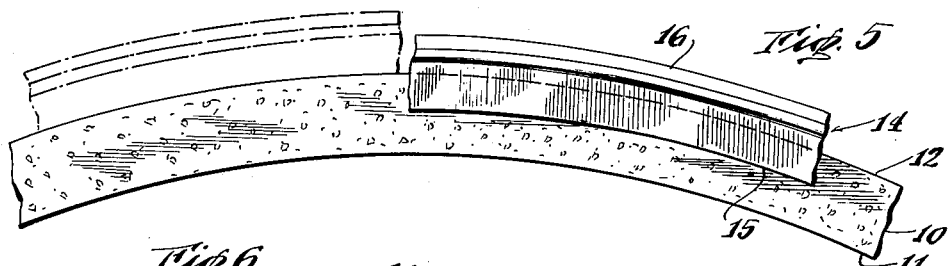
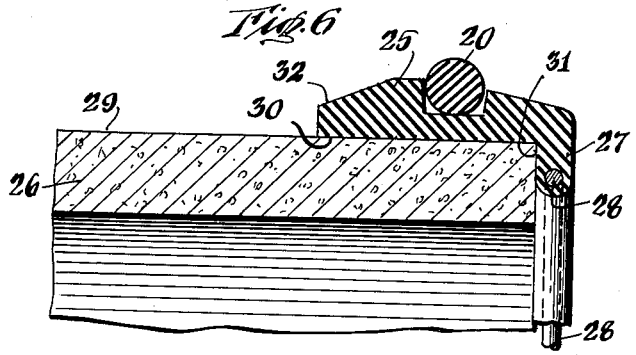
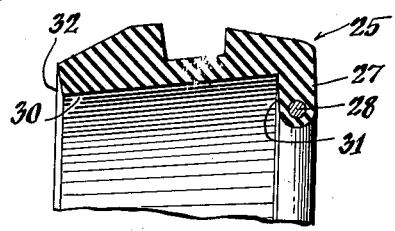
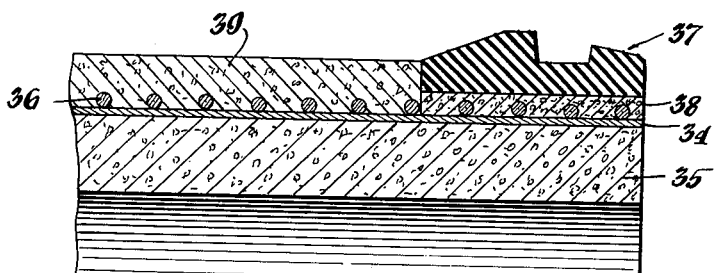
INVENTOR.
Hugh F. Kennison
BY
Robert S. Dunham
ATTORNEY

United States Patent Office 2,722,438
Patented Nov. 1, 1955

2,722,438

FLEXIBLE PACKING FOR PIPE IN SOCKET JOINT

Hugh F. Kennison, Verona, N. J., assignor to Lock Joint Pipe Company, East Orange, N. J., a corporation of New Jersey Application March 31, 1949, Serial No. 84,635

2 Claims. (Cl. 285—163)

This invention relates to pipe sections and to sealing structures for pipe joints of the bell and spigot type.

Among the objects of the invention is to provide sealing structures for the joints of concrete and of other moulded pipe sections whereby gasket-retaining grooves are provided for such pipe sections without weakening the walls of the pipe sections in the vicinity of their spigots.

One of the more efficacious joints employed for sealing the ends of connected pipe sections includes a rubber gasket contained within a groove at the end of a pipe section by a telescopingly engaging pipe section. The gasket is confined in the groove in an inner pipe section by an outer pipe section or bell which fits over the grooved end of the inner pipe section. In ordinary concrete, ceramic or other moulded pipe sections, the presence of a groove in the wall of an inner pipe section tends to weaken the wall where the groove is located. Furthermore, since the width and depth of the groove and the diameter of the outer surface of the pipe section adjacent the groove must be accurate within close tolerances to provide an efficient seal, special molds and care are required for moulding a pipe section with a groove and a bearing surface having the precise dimensions required. An object of the invention is to effect economies in the production of pipe sections by eliminating the need for special and costly moulds and by making the gasket-in-groove type of joint available for use with pipe sections moulded in ordinary tubular moulds. A form of such a pipe section is illustrated in Fig. 1.

The spigot end of a pipe section is completed by applying the sealing structure of the present invention over the plain exterior of the pipe section. The sealing structure comprises a spigot ring or an annular resilient member of rubber or of rubber-like material which requires stretching to be placed over the plain end of the pipe section. This ring member has a normal inner diameter less than that of the outer surface of the pipe section, but the dimensions of the ring are such that when it is mounted in stretched condition upon the pipe section it provides a bearing surface of requisite dimensions for entering the bell of another pipe section and a properly proportioned groove for accommodating a rubber gasket, also of predetermined dimensions.

Another object of the invention is to make available a spigot-forming structure which is suitable for application to a conduit after the conduit has been completed so as to enable the construction of a prestressed wire-wound conduit having the wire winding extending throughout the length of the conduit.

Other objects of the present invention will be hereinafter set forth in the accompanying specification and claims and demonstrated by the drawings which show by way of example a preferred embodiment of the principle of the invention and the best mode which has been contemplated for applying the same.

In the drawings,

Figs. 4 and 5 show the relative proportions between an unstretched spigot structure and a pipe section to which the spigot structure is to be applied;

Fig. 6 illustrates a modified form of the spigot structure of the present invention;

Fig. 7 is a cross-section of the spigot ring shown in Fig. 6 in its moulded or unstretched form; and Fig. 8 illustrates the spigot of a pre-stressed pipe section with a modified form of the spigot structure of the present invention.

Figure 1:
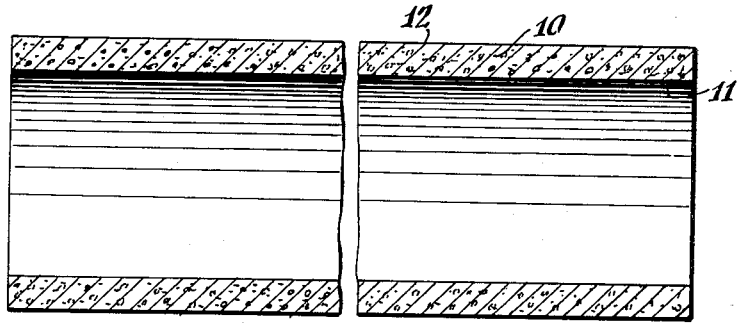
Fig. 1 is a longitudinal section of a moulded pipe section.
Figure 2:
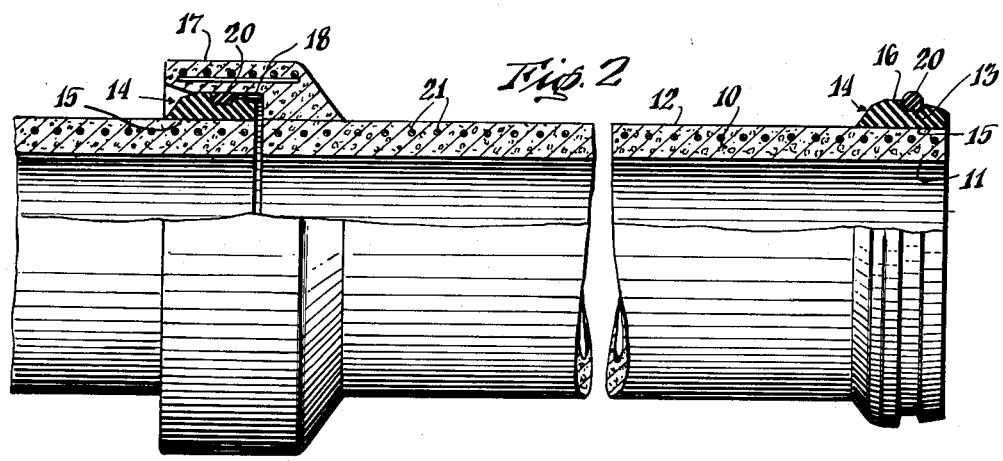
Fig. 2 is a longitudinal section of the pipe section illustrated in Fig. 1 with spigot and bell structures applied thereto.

The pipe section 10 which is illustrated in Figs. 1 and 2 is a simple form of conduit having parallel inner and outer cylindrical surfaces 11 and 12. The invention is particularly useful for converting such a pipe section into one having bell and spigot coupling members, but it is not intended that the application of the invention be limited to a pipe section having a wall of uniform thickness throughout its length. Ceramic and concrete pipe sections are commonly moulded in this form, but are commonly provided with a bell at one end for engaging a complementary end of a similar pipe section. Such pipe sections are usually employed for conducting fluid at relatively low or zero pressures. When the joints of moulded pipes are to be secured for sealing against higher pressures, the complementary bell and spigot ends are designed to receive and contain sealing compounds or gaskets.

The present invention affords a means of utilizing a form of joint for a plain-ended pipe section which has been found particularly efficient for sealing the joints between connecting pipes against relatively high pressures. It is not desirable to form a groove in the wall of a pipe section for providing a joint of the kind hereinabove described because the wall of the pipe would be weakened adjacent the groove. In accordance with the present invention, the groove 13 is provided in a spigot structure 14 which is mounted upon the spigot end of the pipe section, preferably just before the pipe section is to be coupled to another pipe section during the construction of a pipe line. A joint in which the spigot-forming structure forms a part thereof is illustrated in Fig. 2.

The spigot structure may be formed from moulded or extruded rubber or otherwise formed from a synthetic organic plastic material which has suitable characteristics of resiliency, density and stiffness. The material is formed into a ring of such size as to require stretching for placement over the outer wall of the pipe section, Fig. 2.

Before the spigot ring is mounted over the end of the pipe section its inner diameter 15 (Figs. 4 and 5), is considerably less than the diameter of the outer surface 12 of the pipe section. A stretch of between 10 to 20 per cent has been found effective for seizing upon the exterior surface of a concrete pipe section. The contractile force exerted by the ring when it is seated over the end of the pipe section is sufficient to prevent displacement of the ring during use, or because of force exerted thereon by a complementary outer pipe section when the joint is being closed, but the ring may be applied over a coating of adhesive cement, if desired.

Figure 3:
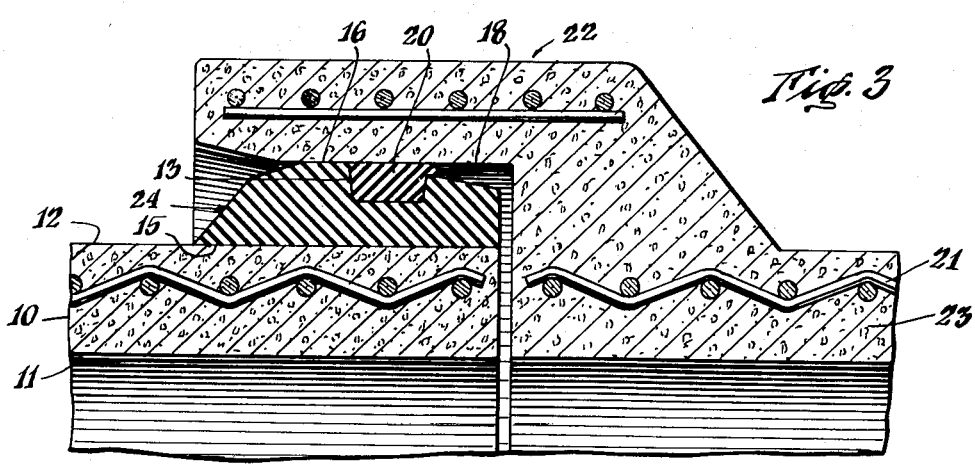
Fig. 3 is a section through a joint embodying the present invention.

When the spigot ring is seated over the spigot end of the pipe section, the outline of its cross-sectional area will be different from that of the ring in its normal unstretched condition. This is because some of the material of which the ring is formed is elongated circumferentially of the ring when the ring is stretched. The ultimate circumferential and cross-sectional dimensions desired of the ring in its stretched condition when it is mounted upon a pipe section are known and taken into consideration in the specifications for producing a ring of correct proportions. The cross-sectional dimensions of the ring when mounted upon the pipe section must be such as to provide a bearing surface 16 and a groove 13 of requisite proportions for satisfying the requirements of a joint formed by a bell 17 having an internal bearing surface 18 of a given diameter, Fig. 2. This is because it is desirable to have a close fit between the outer bearing surface 16 of the spigot ring and the inner bearing surface 18 of the engaging bell. The bell may be applied to an end of the conduit after the conduit has been made and fully cured, as shown in Fig. 2, or it may be an integral part of a straight-walled conduit as shown in Fig. 3.

The groove 13 is located adjacent or alongside of the bearing surface 16 of the spigot ring. The groove is so proportioned that when the spigot ring is stretched and applied over the end of the conduit it will provide sufficient space for accommodating the gasket 20 within the joint.

The gasket 20 is preferably made with a circular cross-section and may be moulded or extruded from rubber having a durometer scale hardness ranging from about 50 to about 70. In this type of joint the volume of the rubber in the gasket and the space for confining the gasket must be carefully predetermined within close tolerances because if the gasket contains too much material it will be difficult to close the joint, and if it contains too little material the joint will not be effective for sealing against desired fluid pressures.

It is an advantage of the construction of the joint of the present invention that the spigot ring 14 is flexible to some degree. The spigot ring preferably has a hardness ranging from about 65 to about 90 on the durometer scale, and is therefore harder and less yieldable than the gasket, but should the gasket contain too much material, the spigot ring has sufficient pliability to yield to a moderate extent. The pliability of the spigot ring affords a means for correcting irregularities which might appear in the surface of a pipe, while at the same time providing a smooth bearing surface 16 which is conformable, if necessary, with the interior of an outer pipe section or bell.

There is illustrated in Fig. 3 a joint formed by coupling together similar concrete pipe sections which have networks of metal 21 within their walls. Each pipe section is formed in one piece by casting the concrete about wires or bars of steel. Except at the bell 22 the pipe section has a wall 23 of uniform thickness. The plain end of each pipe section is provided with a spigot structure 24 which is of the same character as the spigot structure 14 which has been described with reference to Figs. 2, 4 and 5.

In Fig. 6 there is shown a modified form of spigot ring 25 as mounted upon the end of a pipe section 26 having a plain end. This spigot ring is provided with an inwardly extending lip or flange 27 which is an integral part of the spigot ring. A wire ring 28 is contained within the flange 27. This wire ring has a diameter less than the diameter of the outer surface 29 of the pipe section for which the spigot ring is provided. Because of the inextensibility of the wire ring 28 this form of spigot ring has to be originally moulded with the ring portion 25 and its inner surface 30 forming an acute angle with the inner face 31 of the flange 27, as shown in Fig. 7. Therefore the ring requires proportionately greater stretching from the flange to its rear edge 32 in order to apply it to a cylindrical pipe section whose outside diameter is equal to or a little greater than the greatest internal diameter of the spigot ring in its moulded or unstretched condition (Fig. 7). The contractile effect of the main body 25 of the spigot ring and the flange 27 and its contained wire ring 28 prevent the ring from sliding longitudinally of the pipe when a complemental pipe section is advanced over the spigot ring in closing a joint.

The structure of the present invention is applicable for sealing an annular space between inner and outer radially-spaced members such, for example, as the plain end of a tube or conduit extending within a bell of a similar conduit which has an interior surface whose diameter is considerably greater than the outer diameter of the telescoped end of the inner conduit. Accordingly, the invention renders possible the use of relatively inexpensive pipe-manufacturing procedures by which the spigot end of a pipe section may be left plain, that is to say, the pipe section may be moulded without a specially formed spigot ring extending radially beyond the usual outside diameter of the conduit portion of the pipe section.

A form in which the invention may be used to advantage is illustrated in Fig. 8. The pipe section there shown includes a steel sleeve 34, a lining of concrete 35 within the sleeve, and a tensioned wire winding 36 over the sleeve. The tensioned wire winding extends for the full length of the sleeve and maintains the entire sleeve in a state of compression. Before applying the spigot ring 37, a layer of mortar 38 is applied over the last few coils of the wire winding 36 so as to provide a cylindrical base for seating the spigot ring. The rubber spigot ring is then stretched and applied over the mortar coating. By utilizing a spigot ring structure of this type, it is possible to run the wire winding 36 to the spigot end of the pipe section and thereby extend the usefulness and strength giving value of the tensioned winding throughout the length of the pipe section. A coating of mortar or other protective coating 39 may be applied over the wrapping of wire to the rear of the spigot ring 37 to afford protection to the wire, and at the same time to serve as an abutment for the spigot ring.

An advantage of the sealing structure of the present invention is found in the fact that if the wall of the pipe section be out of round or have some other slight imperfection, such as a minor protuberance on its outer surface, the inner surface of the spigot ring will adjust to such imperfection and the ring will tend to absorb any irregularity progressively within its body without materially departing from the desired ultimate dimensions of its exterior bearing surface and groove. Should a moulded pipe section happen to depart slightly from its prescribed specifications, the pliable qualities of the spigot ring permit corrective compensation when a bell is fitted in closing the joint.

What is claimed is:

1. Means for sealing an annular space between concentric inner and outer members and defined by a straight-walled surface on said outer member facing and substantially parallel to a straight-walled surface on said inner member, said sealing means comprising a substantially incompressible though deformable spigot structure comprising a ring of rubber-like material stretched beyond its normal size and contracted upon said straight-walled surface of said inner member in seizing relationship therewith and substantially filling said annular space except for clearance between the periphery of said ring and said straight-walled surface of said outer member and so constituting a stiff collar-like part of a spigot of said inner member seated over and extending radially outwardly from said straight-walled surface of said inner member, a gasket for preventing the flow of fluid between said ring and said outer member, said gasket consisting of rubber-like material softer and more yieldable than said ring, said ring having a circumferential groove in its peripheral surface for seating said gasket, the proportions of said groove when said ring is stretched and contracted upon said inner member and of said gasket being such as to contain said gasket substantially immovable axially with respect to said ring, irrespective of relative movement between said inner and outer members, said gasket and said ring radially pressing upon each other and together pressing the gasket outwardly against said outer member and the ring inwardly against said inner member, whereby said annular space between said outer and inner members is completely sealed.

2. The sealing means set forth in claim 1 wherein said ring has a durometer scale hardness within the range from about 65 to about 90 and said gasket is softer than said ring by at least ten units on the durometer scale.

References Cited in the file of this patent

UNITED STATES PATENTS

| Number | Name | Date |
|---|---|---|
| 1,357,311 | Buente | Nov. 2, 1920 |
| 2,051,557 | Hunziker | Aug. 18, 1936 |
| 2,084,466 | Ukropina | June 22, 1937 |
| 2,145,189 | Nathan et al. | Jan. 24, 1939 |
| 2,170,181 | Allen et al. | Aug. 22, 1939 |
| 2,219,289 | Bennett | Oct. 29, 1940 |
| 2,416,618 | Ferla | Feb. 25, 1947 |
| 2,437,586 | Aber | Mar. 9, 1948 |

FOREIGN PATENTS

| Number | Country | Date |
|---|---|---|
| 670,217 | Germany | Aug. 6, 1935 |
| 668,666 | Germany | Dec. 8, 1938 |
| 531,091 | Great Britain | Dec. 30, 1940 |